US009845003B2

(12) United States Patent
Povinelli

(10) Patent No.: US 9,845,003 B2
(45) Date of Patent: Dec. 19, 2017

(54) HOLLOW VANE WITH STRUCTURE

(71) Applicant: MAGNA INTERNATIONAL INC., Aurora (CA)

(72) Inventor: Anthony John Povinelli, Romeo, MI (US)

(73) Assignee: Magna International Inc., Aurora (CA)

( * ) Notice: Subject to any disclaimer, the term of this patent is extended or adjusted under 35 U.S.C. 154(b) by 0 days.

(21) Appl. No.: 15/126,393

(22) PCT Filed: Mar. 11, 2015

(86) PCT No.: PCT/US2015/019921
§ 371 (c)(1),
(2) Date: Sep. 15, 2016

(87) PCT Pub. No.: WO2015/142582
PCT Pub. Date: Sep. 24, 2015

(65) Prior Publication Data
US 2017/0096060 A1 Apr. 6, 2017

Related U.S. Application Data

(60) Provisional application No. 61/968,087, filed on Mar. 20, 2014.

(51) Int. Cl.
*B60K 11/08* (2006.01)
*B60R 19/52* (2006.01)
(52) U.S. Cl.
CPC .......... *B60K 11/085* (2013.01); *B60R 19/52* (2013.01); *B60R 2019/525* (2013.01)

(58) Field of Classification Search
CPC .......... E06B 7/086; E06B 7/096; E06B 9/386; E06B 7/084; B60K 11/085
See application file for complete search history.

(56) References Cited

U.S. PATENT DOCUMENTS 3,047,914 A * 8/1962 Kahn ...................... E06B 7/084
49/390
4,382,460 A * 5/1983 Ben-Tal ................ E06B 7/084
160/236

(Continued)

FOREIGN PATENT DOCUMENTS

DE  102010060253 A1  5/2012
EP      0179304 A1  4/1986

(Continued)

OTHER PUBLICATIONS

International Search Report for International Application No. PCT/US2015/019921, dated Jun. 10, 2015.

*Primary Examiner* — Hau V Phan
(74) *Attorney, Agent, or Firm* — Warn Partners, P.C.

(57) ABSTRACT

A hollow vane structure for an active grille system 100 having a first piece 12 of the vane body 10 that includes a front side 14 and a back side 16. The first piece 12 has a concave cross-section extending from the front side 14 toward the back side 16. This concave section creates a hollowed inward section 18 on the back side 16 of the first piece 12. The first piece 12 also includes an edge surface 20 formed on the first piece which defines a perimeter of the hollowed inward section 18. A second piece 22 of the vane body is connected to the back side 16 of the first piece 12 and extends across the hollowed inward section 18 and is connected to the first piece 12 to at least the edge surface 20 on the back side 16 of the first piece 12.

7 Claims, 3 Drawing Sheets

(56) References Cited

U.S. PATENT DOCUMENTS

| | | | | |
|---|---|---|---|---|
| 4,753,288 A * | 6/1988 | Harvey | ............... | B60K 11/085 123/41.04 |
| 5,358,024 A * | 10/1994 | Schwaegerle | ........... | E06B 9/386 160/236 |
| 5,921,028 A * | 7/1999 | Marocco | ................ | E06B 7/086 49/403 |
| 6,145,251 A * | 11/2000 | Ricci | ....................... | E06B 7/096 49/74.1 |
| 2013/0223980 A1 * | 8/2013 | Pastrick | ................... | F01D 5/00 415/1 |

FOREIGN PATENT DOCUMENTS

| | | | |
|---|---|---|---|
| EP | 0308601 | A2 | 3/1989 |
| FR | 2992590 | A1 | 1/2014 |
| GB | 1153361 | A | 5/1969 |
| JP | 2004276712 | A | 7/2004 |
| WO | 2011009212 | A1 | 1/2011 |
| WO | 2014036432 | A1 | 3/2014 |

\* cited by examiner

US 9,845,003 B2

HOLLOW VANE WITH STRUCTURE

This application is a National Stage of International Application No. PCT/US2015/019921, filed May 11, 2015. This application claims priority to Provisional Patent Application No. 61/968,087 filed on May 20, 2014. The disclosure(s) of the above application(s) is (are) incorporated herein by reference.

FIELD OF THE INVENTION

The present invention relates to a hollow vane structure for use in an active grille system for automotive applications.

BACKGROUND OF THE INVENTION

Active grille systems have been developed which implement a frame having movable vanes capable of rotating between an open position and a closed position in order to selectively block or allow air flow into an engine compartment. During engine start-up the vanes can be closed in order to prevent outside air from flowing into the engine compartment and cooling the components of the engine, at least until the engine has reached optimal operating temperatures. Then once the desired engine temperature has been reached, the vanes can be opened or adjusted to allow air to flow through the engine compartment and cool the engine in order to help prevent the engine from becoming too hot.

One key element in an active grille system is the vane, which is sometimes referred to as a louver or flap, which opens and closes. All vanes today are a single material thickness and are designed to provide some degree of bending and some degree of torsional stiffness. In order to get the proper structure of the vane, a large amount of material is required, however this can cause the vane to be too large and block the critical airflow to the cooling modules due to the vane thickness. It is desirable to create a vane used in combination with an active grille system that uses less material and provides a thinner vane, while meeting the requirements of high bending strength and torsional stiffness.

SUMMARY OF THE INVENTION

A hollow vane structure for an active grille system having a first piece of the vane body that includes a front side and a back side. The first piece has a concave cross-section extending from the front side toward the back side. This concave section creates a hollowed inward section on the back side of the first piece. The first piece also includes an edge surface formed on the first piece which defines a perimeter of the hollowed inward section. A second piece of the vane body is connected to the back side of the first piece and extends across the hollowed inward section and is connected to the first piece to at least the edge surface on the backside of the first piece.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 5:
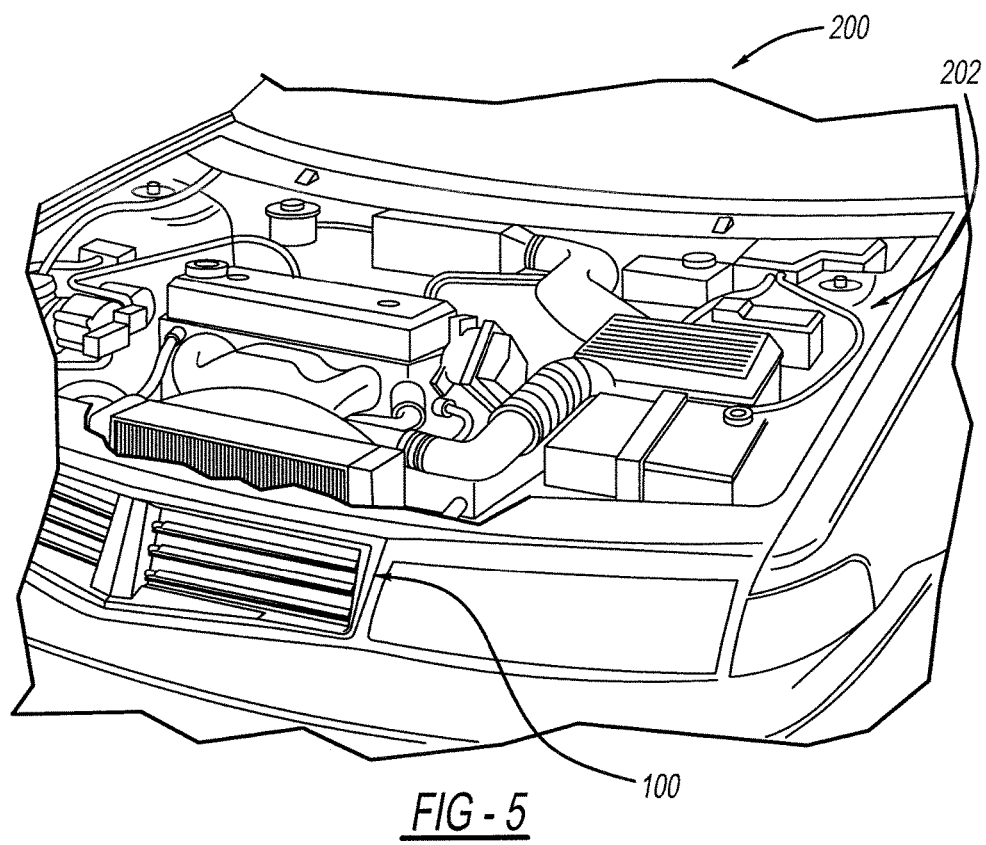
FIG. 5 is a front perspective view of a vehicle having an active grille shutter arrangement.

Referring now to FIG. 5 a front perspective view of a vehicle 200 is shown. The vehicle 200 has an active grille shutter arrangement 100 that allows air to pass from the outside of the vehicle, through the arrangement 100 and into an engine compartment 202. The active grille shutter arrangement 100 selectively controls the airflow into the engine compartment 202, as described in greater detail below.

Figure 3:
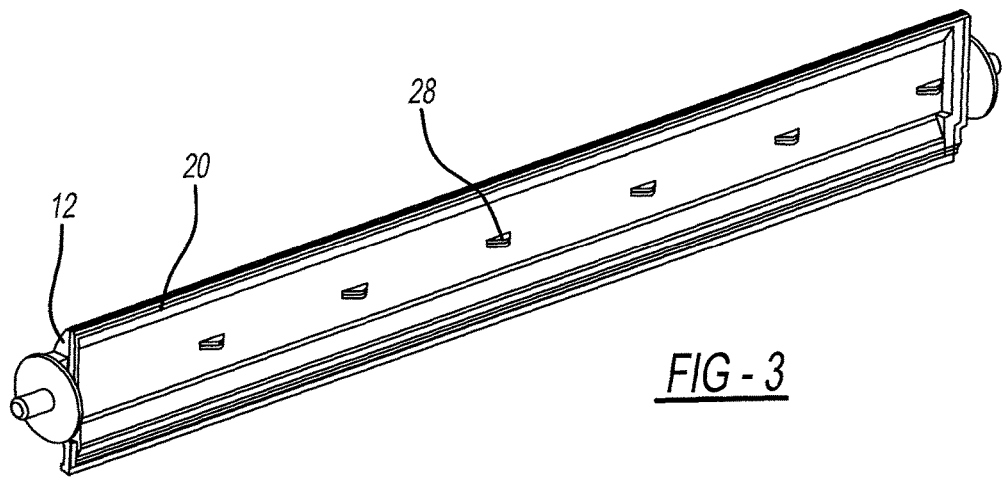
FIG. 3 is a back side perspective view of a hollow vane with the rubber panel removed.
Figure 4:
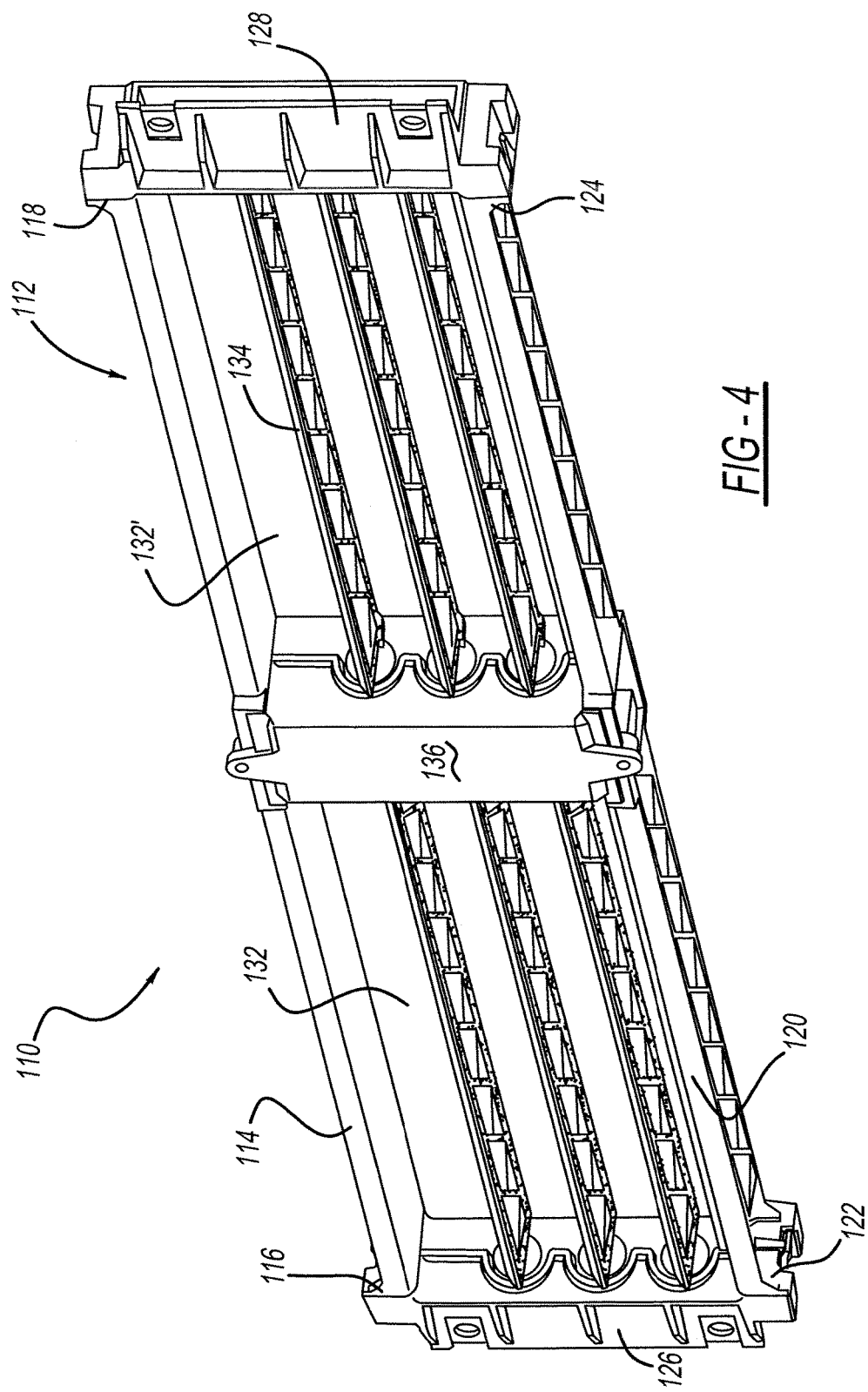
FIG. 4 is an angled perspective view of an active grille shutter arrangement.

Referring now to FIG. 4 the active grille shutter arrangement 100 having a frame 112 is depicted. The assembled frame 112 has as upper frame portion 114 having a first end 116 and a second end 118, as well as a lower frame portion 120 having a first end 122 and a second end 124; a first cap 126 and a second cap 128. The first end cap 126 and second end cap 128 are connected to the upper frame portion 114 and the lower frame portion 122 of the frame 112. As shown in the drawings, the shape of the assembled frame 112 is generally rectangular; however, it is possible for the frame 112 to have different shapes depending on the particular application. The frame 112 has one or more apertures, which in the present embodiment of the invention is a first aperture 132 and a second aperture 132' created to allow air to pass through the frame 112. Between the first aperture 132 and second aperture 132' there is a center bar 136 that contains a drive mechanism. A number of hollow vanes 134 having a vane body 10, as described with regard to FIGS. 1-3 described below, extend across one of the first aperture 132 or the second aperture 132' and rotatably connect at one end of the hollow vane to the actuator (not shown) contained within the center bar 136 and a second end of the hollow vane to the first end cap 126 or the second end cap 138. Each of the hollow vanes 134 are capable of rotating about its axis between a closed position where the hollow vanes 134 will block its respective first aperture 132 or second aperture 132', and an open position where air will freely pass through the first aperture 132 or the second aperture 132'.

Figure 1:
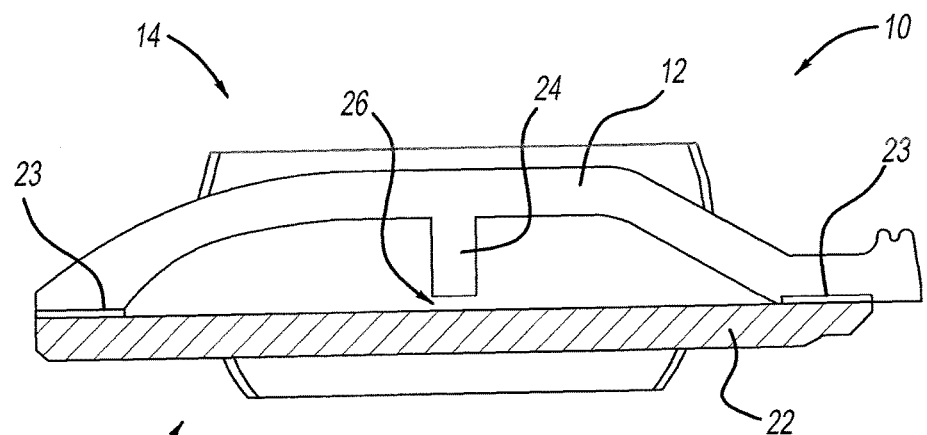
FIG. 1 a cross-sectional plan view of a vane in accordance with one embodiment of the present invention.
Figure 2:
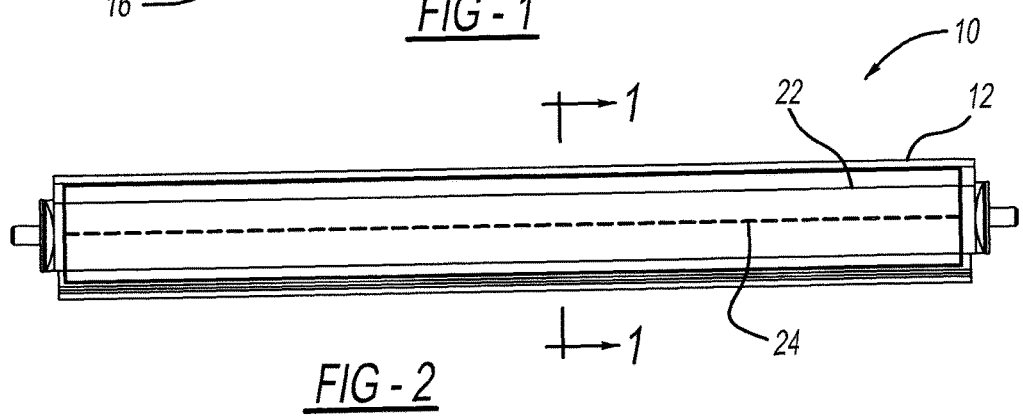
FIG. 2 is a back side plan view of a hollow vane in accordance with the present embodiment of the invention.

Referring now to FIGS. 1 and 2 a hollow vane structure has a vane body 10 in accordance with a first embodiment of the present invention is shown. The vane body 10 is assembled and forms part of an active grille system in an automobile.

The vane body 10 includes a first piece 12 having a front side 14 and back side 16. The first piece 12 has a concave cross-sectional shape such that the back side 16 of the vane body 10 has a hollowed inward section 18 that is hollowed inward toward the front side 14 forming the concave shape. The first piece 12 also includes an edge surface 20 formed on the first piece 12 which defines a perimeter of the hollowed inward section 18. A second piece 22 of the vane body 10 is connected to the back side 16 of the first piece 12 and extends across the hollowed inward section 18 and is connected to the edge surface 20 of the first piece 12. The second piece 22 is joined at a connection 23 to the edge surface 20 in several different ways including adhesives, vibration welding, ultrasonic welding, hot plate welding, snap fittings or resistive implant welding where a conductive mesh material is placed at the connection 23 between the edge section 20 and the second piece 22. The connection 23 includes a multitude of materials ranging from soft to hard plastics including acrylonitrile butadiene styrene, thermoplastic polyolefin and combinations thereof or other material that will provide torsional and bend strength or they can be made of rubber, silicone or other soft polymers which will provide better sealing contact. The type of material used for the connection 23 depends on the specific design criteria, therefore the listed materials are by no means an exhaustive list of all possible materials. The present invention allows for two different material types to be used, creating the vane body 19 which can meet several different types of design criteria. For example, the first piece 12 and second piece are formed from acrylonitrile butadiene styrene, thermoplastic polyolefin and combinations thereof or other material that will provide torsional and bend strength or they can be made of rubber, silicone or other soft polymers which will provide better sealing contact with the adjacent vanes and active grille frame when the active grille system is placed in the closed position. The type of material used depends on the specific design criteria. The materials listed are by no means an exhaustive list of all the possible materials. The use of different materials also allows for a reduction in the amount of weight of the individual vane bodies.

The concave shape of the first piece 12 provides a reduction in weight of the vane body 12 since the hollowed inward section 18 is created. The hollowed inward section 18 can cause a weak area or unwanted flexing of the second piece 22 in the area where the second piece 22 extends across the hollowed inward section 18, which can cause the second piece 22 to collapse under load, especially during the attachment of the second piece 22 to the first piece 12. In some applications it is necessary to support the second piece 22 by forming a rib in the hollowed inward section 18. In the first embodiment of the invention show in FIGS. 1 and 2 there is a continuous rib 24 formed in the hollowed inward section 18 and extends continuously and longitudinally parallel the axis of the vane body 10. In the present embodiment of the invention the second piece 22 contacts the rib 24 but the second piece 22 and rib 24 are not joined. FIG. 1 also shows a clearance or gap 26 between the rib 24 and the second piece 22. The gap 26 is created by the rib 24 being shorter in length so that the rib 24 stays below a plane of the second piece 22, when the second piece 22 is placed across the hollowed inward section 18. During assembly the second piece 22 is pressed onto the first piece 12 to create the connections 23 at the edge surface 22. This causes the second piece 22 to flex or bend across the gap and contact the rib 24 so that the second piece 22 will be supported by the rib 24 during the compression steps. However, in is it desirable to the second piece 22 to be positioned away from the rib 24 so that gap 26 is present when the vane body 10 is fully assembled.

Figure 6:
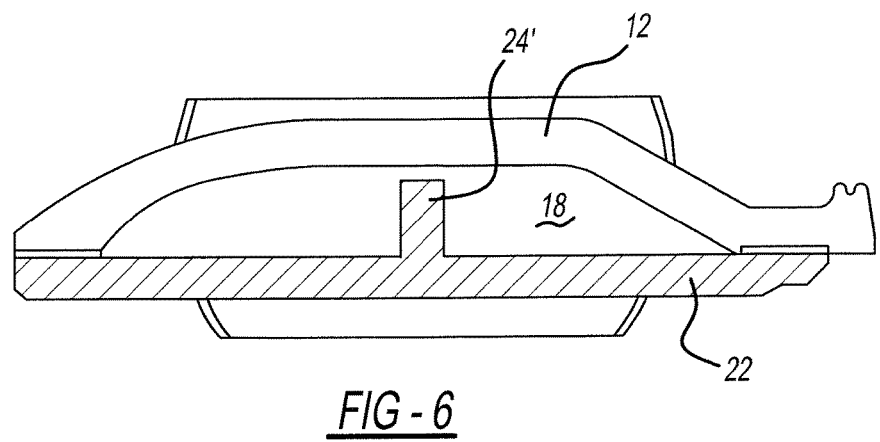
FIG. 6 is a cross sectional plan view of a vane in accordance with an alternate embodiment of the invention.

In another aspect of the invention, shown in FIG. 6 a rib 24' is connected to the second piece 22 and extends into the hollow inward section 18 of the first piece 12 to support the second piece 22 when the vane body 10 is fully assembled.

FIG. 3 shows an alternate embodiment of the invention, where the vane body 10 is shown with the second piece 22 removed. The first piece 12 in this embodiment of the invention has one or more bumps 28 formed in the hollowed inward section 18 instead of a continuous rib 24. The one or more bumps 28 extend toward the second piece 22 and support the second piece 22 during assembly to the first piece 12. The use of one or more bumps 28 further reduced the amount of material required since providing bumps 28 uses less material than a single continuous rib. While the present embodiment of the invention shows bumps 28 and the first embodiment of the invention shows a continuous rib 24, it is within the scope of this invention for other types of support structures to be used. For example is within the scope of this invention for there to be multiple rows of ribs and bumps, different shaped cross sections such as triangles, ovals, rectangles, cross and crosses, etc. It is also within the scope of this invention for there to be no support structure at all present in the hollowed inward section 18 of the vane body 10.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An active grille shutter arrangement having a hollow vane structure comprising:

a frame of the active grille shutter arrangement having an upper frame portion with a first end and a second end and a lower frame portion with a first end and a second end;

said frame further including a first cap connectable to both the first end of the upper frame portion and the first end of the lower frame portion and a second cap connectable to both the second end of the upper frame portion and the second end of the lower frame portion, said frame creates one or more apertures for airflow through said frame;

a plurality of vanes rotatably positioned between the first end cap and the second end cap for controlling the amount of air flowing through one or more apertures formed by the assembled frame, each of said plurality of vanes has a first piece of the vane body having a front side and a back side, wherein the first piece has a concave cross-section extending from the front side toward the back side creating a hollowed inward section on the back side of the first piece; an edge surface formed on the first piece defining a perimeter of the hollowed inward section; a second piece of the vane body connected to the back side of the first piece, where in the second piece extends across the hollowed inward section and is connected to the first piece to at least the edge surface on the backside of the first piece;

wherein each one of the plurality of vanes has at least one rib formed in the hollowed inward section of the first piece;

wherein each one of the plurality of vanes has a gap between said at least one rib and said second piece, wherein said gap is created by the at least one rib being shorter in length so that the at least one rib stays below the second piece and the gap is present when the vane body is fully assembled; and a center bar extending between the upper frame portion in the lower frame portion, wherein each one of the plurality of vanes has two ends where one of said two ends is rotatably connected to the center bar and the other of said two ends is connected to one of the first end cap or the second end cap.

2. The hollow vane structure of claim 1 wherein the second piece is made from one selected from the group consisting of rubber, silicone, soft polymers and combinations thereof.

3. The hollow vane structure of claim 1 wherein the first piece is made from one selected from the group consisting of polypropylene, acrylonitrile butadiene styrene, thermoplastic polyolefin and combinations thereof.

4. The hollow vane structure of claim 1, where in the second piece is joined at a connection to the edge surface by one or more of the following selected from the group consisting of adhesives, vibration welding, ultrasonic welding, hotplate welding, snap fittings or resistive implant wilding where a conductive mesh material is placed at the connection between the edge section and the second piece, or combinations thereof.

5. The hollow vane structure of claim 1, wherein each said at least one rib extends continuously and longitudinally parallel to the axis of the vane body.

6. The hollow vane structure of claim 1, further comprising at least one rib formed on the second piece and extending into the hollowed inward section of the first piece when the second piece is connected to the first piece.

7. The hollow vane structure of claim 1, wherein the first piece has one or more bumps formed into the hollowed inward section that extend toward the second piece.

* * * * *

UNITED STATES PATENT AND TRADEMARK OFFICE
CERTIFICATE OF CORRECTION

| | | |
|---|---|---|
| PATENT NO. | : 9,845,003 B2 | Page 1 of 1 |
| APPLICATION NO. | : 15/126393 | |
| DATED | : December 19, 2017 | |
| INVENTOR(S) | : Anthony John Povinelli | |

It is certified that error appears in the above-identified patent and that said Letters Patent is hereby corrected as shown below:

In the Specification

Column 3,
Line 57-58, "in is it desirable to the" should be -- it is desirable for the --

In the Claims

Column 5,
Claim 4, Line 9, "where in" should be -- wherein --

Column 5,
Claim 4, Line 14, "wilding" should be -- welding --

Signed and Sealed this
Twenty-second Day of May, 2018

Andrei Iancu
*Director of the United States Patent and Trademark Office*